Nov. 22, 1966    G. E. ESCH    3,286,573
PIZZA CUTTER
Filed May 18, 1964
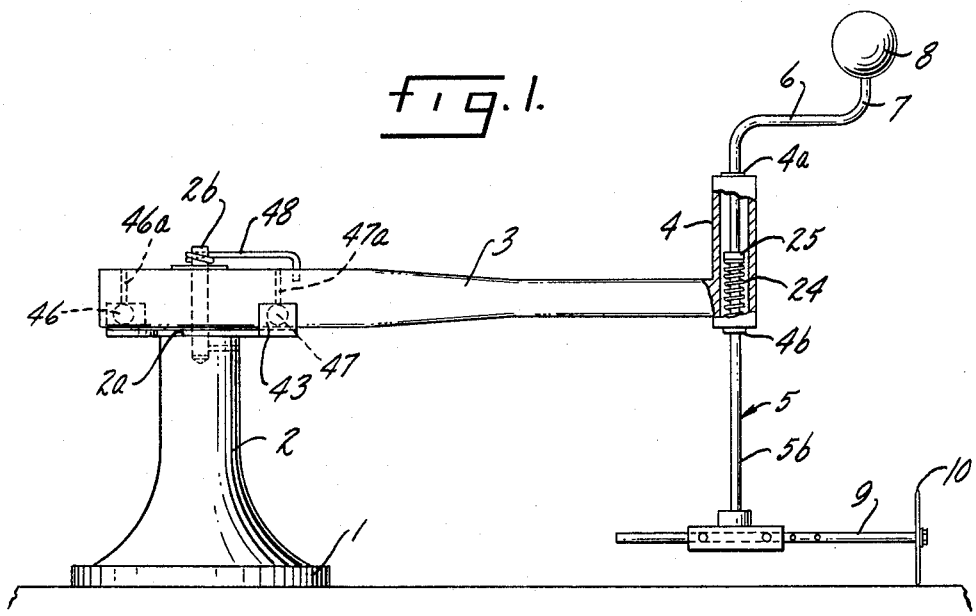
fig. 1.
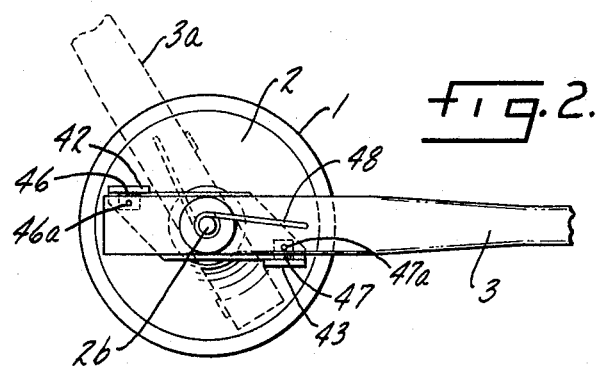
fig. 2.
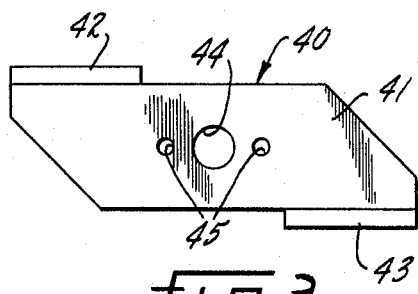
fig. 3.
fig. 4.
INVENTOR.
George E. Esch,
BY Parker & Carter
Attorneys.

3,286,573
PIZZA CUTTER
George E. Esch, 5324 S. Ashland Ave., Chicago, Ill.
Filed May 18, 1964, Ser. No. 368,304
5 Claims. (Cl. 83—490)

This application is a continuation-in-part of copending application, Serial No. 289,127, filed June 19, 1963, and now abandoned, for "Pizza Cutter."

This invention relates to forming mechanisms and has particular relation to means for cutting dough.

One purpose of the invention is to provide means for rapidly and uniformly cutting or forming a relatively flat, round sheet of dough as a step in the creation of the food product known as "pizza."

Another purpose is to provide a cutting mechanism for forming a round sheet of pizza dough, which mechanism shall be of maximum simplicity in construction and maximum economy in cost and manufacture.

Another purpose is to provide a pizza-cutting mechanism adjustably effective to cut pizza dough "rounds" of varying diameters.

Another purpose is to provide a pizza cutter which may be moved into operating position and which may be rotated out of operating position when desired.

Another purpose is to provide a pizza dough cutting mechanism capable of rapid, high-production operation and free of human error.

Another purpose is to provide a pizza-cutting mechanism which shall be free of any tendency to become clogged or cluttered with the dough being cut.

Another purpose is to provide a pizza-cutting mechanism having means retaining the same in pizza-cutting position.

Another purpose is to provide a pizza-cutting mechanism having yieldable retention means effective to hold the mechanism in cutting position.

Another purpose is to provide a pizza-cutting mechanism having means holding the same yieldably in storage position and means for overcoming said yielding means when the pizza-cutting mechanism is in operating position.

Another purpose is to provide a pizza-cutting mechanism having yielding means urging the same toward a storage position and magnetically attractable elements holding the same in an operating position.

Other purposes will appear from time to time during the course of the specification and claims.

FIGURE 1 is a side elevation illustrating variant form of the invention;

FIGURE 2 is a detailed top view of the structure illustrated in FIGURE 1;

FIGURE 3 is a detailed view of a portion of the invention illustrated in FIGURE 1; and FIGURE 4 is an end view of the structure illustrated in FIGURE 3.

Like parts are indicated by like numerals throughout the specification and drawings.

Referring now to the structure of the invention illustrated in FIGURES 1-3, it will be observed that the numeral 1 generally designates a base. The support pedestal 2, however, in the structure of FIGURES 1-4 has an upper relatively flat surface 2a from which rises a post 2b. The arm 3 is rotatably mounted on the post 2b. Supported on the upper surface 2a of post 2b is a stop member 40. The member 40 has a base 41 and a pair of upstanding, parallel stop surfaces 42, 43 longitudinally spaced along and on opposite sides of the base 41. The member 40 is centrally apertured as at 44 for passage therethrough of post 2b. Suitable apertures 45 are provided for reception of appropriate attaching elements (not shown) effective to secure the member 40 to the base 2.

It will be realized that the member 40 is set on the base 2 for longitudinal alignment with the plane occupied by the arm 3 when the device of the invention is in cutting position. Thus the arm 3 has an end portion, on one side thereof, which abuts the inner surface of upstanding abutment stop plate 42 and the arm 3 has an intermediate portion on the opposite side thereof which abuts the inner surface of the upstanding stop plate 43 when the arm 3 is in cutting position. The arm 3 carries a magnetized element 46, shown in dotted lines in FIGURES 1 and 2, an end surface of the magnet 46 being exposed for contact with the member 42 when the arm 3 is in cutting position. A similar magnetized element 47 is carried by the arm 3 for engagement with the stop plate 43 when the arm 3 is in said cutting position. Like the elements 46, 47, passages 46a, 47a are shown in dotted lines in FIGURE 1 and may be employed to secure the elements 46, 47 in the arm 3.

A yielding means, such as the spring 48, has its opposite ends in engagement with the post 2b and the arm 3 in such manner as to urge the arm 3 toward storage position, as illustrated in dotted lines at 3a in FIGURE 2.

The use and operation of the invention are as follows:

The base 1 is secured to a suitable work surface and preferably to a corner or rear portion thereof. With the arm 3 and the mechanism carried thereby held in a storage or inactive area on standard 2, the pizza dough to be cut is set out on the work surface. With the arm 3 rotated into the desired position, the cutter mechanism is centered over the work area and over the dough to be cut, with rod 5 overlying the intended center of the pizza round to be formed. Thereupon the operator grasps handle 8 and exerts downward pressure thereon. Since spring 24 is required only to hold the relatively light weight of elements 5-10, a relatively small amount of downward pressure is required on the part of the operator to overcome the action of spring 24 and to move the cutting wheel 10 into severing engagement with the dough therebeneath. It will be understood that normally the work surface involved will take the form of the relatively thick wooden table or block.

With the cutting wheel 10 thus held in contact engagement with the work surface, the operator, continuing the slight downward pressure required to overcome spring 24, merely rotates the handle 8 and arm 6 about the axis of shaft 5. Since the handle 8 is rotatably mounted on the arm portion 7, the rotation of arm 6 about the axis of rod 5 results also in rotation of the handle 8 about the upstanding arm portion 7. As the rod 5 is thus rotated in housing 4, the arm 9 is rotated equally with arm 6 and the cutting wheel 10 is rotated through a circular path and returned to its starting point.

When the pizza round has thus been formed, the operator rotates the arm 3 and mehanism carried thereby out of the work area.

When the operator released the handle 8 upon completion of the cutting operation, the spring 24 lifted the cutting wheel out of engagement with the work surface and the pizza dough, thus freeing the mechanism for return to the storage position without fear of distorting contact with the pizza round just formed. The work area is then cleared and the operation is repeated.

Referring now to the operation of the form of the invention illustrated in FIGURES 1-4, it will be observed that the operator may move the device of the invention between assurred storage and cutting positions with ease with one hand. The invention of FIGURES 1-4 will retain the desired storage or operative position into which it is placed without additional action by the operator. With the device in the position illustrated in FIGURES 1 and 2, for example, the magnetized elements 46, 47 retain the arm 3, and thus the entire cutting mechanism, in its cutting position by the attraction of the elements 46, 47 with the parallel abutment plates 42, 43. The strength of the elements 46, 47 is sufficient to overcome the urging of spring 48. Moreover, during a large portion of the rotation of member 5 the forces thereby effective on the arm 3 tend to retain arm 3 in the operative position shown in FIGURES 1 and 2. When the operator desires to return the device of the invention to the storage position, it is only necessary that the operator press forward, as the parts are shown in the drawings, on the housing 4 to break the magnetic attraction between the elements 46, 47 and plates 42, 43. While said attraction is sufficient to overcome the force of spring 48, it will be understood that it is easily overcome by manuel pressure on housing 4 which is spaced substantially the length of arm 3 from post 2b. The moment said magnetic attraction is broken, the spring 48 takes over and is free to rotate the arm 3 into the storage position illustrated in dotted lines in FIGURE 2. It will be noted, further, that the abutment plates 42, 43 serve as stop means for said storage position, the opposed inner edges of the plates 42, 43 being contacted by the surfaces of arm 3 opposite those bearing the elements 46, 47.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

There is claimed:

1. A pizza cutter comprising a base, a support rising from said base, an arm pivoted on said support and laterally extending therefrom, a housing carried by said arm, a rod rotatably and reciprocally carried by said housing and extending vertically above and below said housing, a second arm extending laterally from said rod above said housing, a handle carried by said arm, a third laterally extending arm carried by said rod below said housing, a cutter wheel rotatably carried by said arm, said arm being rotatable between an operative and a storage position, yielding means engaging said arm and said support and effective to urge said arm toward said storage position, and means for retaining said arm in said operative position, said means including at least one magnetized element carried by said arm, an abutment plate upstanding from said support and positioned for contact by said magnetized element when said arm is in said operative position.

2. A pizza cutter comprising a base, a support rising from said base, an arm pivoted on said support and laterally extending therefrom, a housing carried by said arm, a rod rotatably and reciprocally carried by said housing and extending vertically above and below said housing, a second arm extending laterally from said rod above said housing, a handle carried by said arm, a third laterally extending arm carried by said rod below said housing, a cutter wheel rotatably carried by said arm, said arm being rotatable between a storage and an operative position, yielding means engaging said arm and effective to urge said arm toward said storage position, an abutment element carried by said support for contact by said arm when said arm is in operative position, magnet means engaging said abutment plate and said arm when said arm is in operative position, said magnet means being effective to overcome the force of said yielding means.

3. A pizza cutter comprising a base, a support rising from said base, an arm pivoted on said support and laterally extending therefrom, a housing carried by said arm, a rod rotatably and reciprocally carried by said housing and extending vertically above and below said housing, a second arm extending laterally from said rod above said housing, a handle carried by said arm, a third laterally extending arm carried by said rod below said housing, a cutter wheel rotatably carried by said arm, said arm being rotatable between a storage and an operative position, yielding means engaging said arm and effective to urge said arm toward said storage position, an abutment element carried by said support for contact by said arm when said arm is in operative position, magnet means engaging said abutment plate and said arm when said arm is in operative position, said magnet being effective to overcome the force of said yielding means, said abutment plate having a surface engaging said arm when said arm is in said storage position.

4. A pizza cutter comprising a base, a support rising from said base, an arm pivoted on said support and laterally extending therefrom, a housing carried by said arm, a rod rotatably and reciprocally carried by said housing and extending vertically above and below said housing, a second arm extending laterally from said rod above said housing a handle carried by said arm, a third laterally extending arm carried by said rod below said housing, a cutter wheel rotatably carried by said arm, a plate carried by said support, a pair of spaced, parallel abutment elements upstanding from opposite sides of said plate, said abutment elements being aligned with the axis of said arm when said arm is in operative position, magnetized elements engaging said arm and said elements when said arm is in operative position, and means yieldingly urging said arm against the action of said magnetized elements.

5. A pizza cutter comprising a base, a support rising from said base, an arm pivoted on said support and laterally extending therefrom, a housing carried by said arm, a rod rotatably and reciprocally carried by said housing and extending vertically above and below said housing, a second arm extending laterally from said rod above said housing, a handle carried by said arm, a third laterally extending arm carried by said rod below said housing, a cutter wheel rotatably carried by said arm, a plate carried by said support, a pair of spaced, parallel abutment elements upstanding from opposite sides of said plate, said abutment elements being aligned with the axis of said arm when said arm is in opeartive position, magnetized elements engaging said arm and said elements when said arm is in operative position, and means yieldingly urging said arm against the action of said magnetized elements, said abutment elements each having a surface engaging an opposite side of said arm when said arm is in storage position.

References Cited by the Examiner
UNITED STATES PATENTS

| | | | |
|---|---|---|---|
| 260,783 | 7/1882 | Proctor | 30—310 |
| 884,762 | 4/1908 | Risting et al. | 77—78 |
| 1,511,016 | 10/1924 | Barker | 77—77 |
| 1,610,520 | 12/1926 | Herrmann | 77—77 |

FRANCIS S. HUSAR, *Primary Examiner.*